(12) United States Patent
Ehlbeck

(10) Patent No.: US 6,374,173 B1
(45) Date of Patent: Apr. 16, 2002

(54) TERRAIN ADAPTIVE CRUISE CONTROL

(75) Inventor: James M. Ehlbeck, LaCenter, WA (US)

(73) Assignee: Freightliner LLC, Portland, OR (US)

(*) Notice: Subject to any disclaimer, the term of this patent is extended or adjusted under 35 U.S.C. 154(b) by 0 days.

(21) Appl. No.: 09/322,203

(22) Filed: May 28, 1999

(51) Int. Cl.$^7$ ............................. G06F 7/00; G06F 17/00
(52) U.S. Cl. ............................. 701/93; 701/65; 701/80; 340/438; 180/170
(58) Field of Search ............................. 701/65, 79, 80, 701/93, 94; 180/170; 340/438, 439

(56) References Cited

U.S. PATENT DOCUMENTS

| | | | |
|---|---|---|---|
| 4,211,193 A | 7/1980 | Cox et al. | 123/352 |
| 4,419,729 A | 12/1983 | Krieder | 364/426 |
| 4,467,428 A | 8/1984 | Caldwell | 364/426 |
| 4,535,865 A | 8/1985 | Tanigawa et al. | 180/177 |
| 4,561,057 A * | 12/1985 | Haley, Jr. et al. | 701/117 |
| 4,914,597 A | 4/1990 | Moncelle et al. | 364/426.04 |
| 4,922,428 A | 5/1990 | Takahashi | 364/426.04 |
| 4,952,922 A * | 8/1990 | Griffin et al. | 340/729 |
| 5,019,986 A | 5/1991 | Londt et al. | 364/426.04 |
| 5,031,715 A | 7/1991 | Ogawa et al. | 180/179 |
| 5,177,683 A * | 1/1993 | Oo et al. | 701/93 |
| 5,197,564 A | 3/1993 | Nishimura et al. | 180/179 |
| 5,224,045 A | 6/1993 | Stasell | 364/431.07 |
| 5,343,780 A | 9/1994 | McDaniel et al. | 477/108 |
| 5,348,115 A | 9/1994 | Devier et al. | 180/308 |
| 5,393,277 A | 2/1995 | White et al. | 477/108 |
| 5,420,793 A * | 5/1995 | Oo et al. | 701/93 |
| 5,615,654 A | 4/1997 | Weisman, II et al. | 123/350 |
| 5,634,446 A | 6/1997 | Rauznitz et al. | 123/322 |
| 5,663,880 A | 9/1997 | Saur et al. | 701/93 |
| 5,839,534 A | 11/1998 | Chakraborty et al. | 180/169 |
| 5,868,214 A * | 2/1999 | Workman | 180/179 |

OTHER PUBLICATIONS

Bohn, "Cummins to show new 'smart' engines," *Automotive News*, #5487, p. 16 (Feb. 2, 1993).
Cummins N14 Plus Engine; 4–pg. advertisement; http://www.cummins.com/onhigh/n14.html (Apr. 7, 1999).
FAQ: Fuzzy Logic and Fuzzy Expert System, "[2] What is fuzzy logic?" http://www.cs.cmu.edu/Groups/AI/html/fazs/ai/fuzzy/part1/fal–doc–2.html, monthly posting, pp. 1–4 (Apr. 15, 1993).
Holcomb, "Technology in trucks is accelerating rapidly," spokane.net, http://www.spokane.net/stories/1998/Oct/3/S460811.asp.
Richards, "Variable power," *Automotive Industries*; 172:10 p. 98 (Oct. 1992).
TCIP (Transit Communications Interface Profiles) White Paper: Standard On Board (OB) Objects, Draft V.O.3, pp. 1–30 (Mar. 24, 1998).
*Trulink Tech Bulletin*, "Cat ® 3176B Truck Engine," pp. 1–3 (Jul. 1, 1994).
*Truklink Tech Bulletin*, "Cruise Control Smoothes Rolling Terrain," 1 page (Jun. 1, 1994).
Tucker, "Logic–Based Deductive Reasoning," *The Computer Science and Engineering Handbook*, Ch. 29, pp. 654–655; 666–668 (1997).

* cited by examiner

Primary Examiner—Gertrude Arthur
(74) Attorney, Agent, or Firm—Klarquist Sparkman, LLP

(57) ABSTRACT

An electronic vehicle system monitors vehicle parameters and calculates variables such as acceleration to determine when the vehicle is cresting a hill. An action is taken to alter operation of the cruise control to avoid expending excess fuel or braking as the vehicle descends the downward grade. In one implementation, a message is displayed to a driver indicating the driver should reset the cruise set speed. In another implementation, the system automatically resets the cruise set speed without driver intervention. In yet another implementation, the system automatically resets the cruise set speed and automatically increases the set speed as the vehicle accelerates. An exemplary embodiment employs variable smoothing and a fuzzy logic system with a degree of confidence variable and an increase-in-acceleration rule.

28 Claims, 12 Drawing Sheets

TERRAIN ADAPTIVE CRUISE CONTROL

TECHNICAL FIELD

The invention relates to an automated cruise control system in a vehicle.

BACKGROUND OF THE INVENTION

Cruise control systems have been developed for a wide variety of vehicles and have evolved to include a variety of features. Typical cruise control systems function by applying engine power to maintain a vehicle's speed at a driver-selected set speed, relieving the driver from manually adjusting the vehicle's speed. Additionally, a cruise control system may have additional functions to accelerate while cruising or resume the cruise set speed after braking.

However, a problem can develop with typical cruise control systems when the vehicle encounters hilly terrain with steep undulating grades. For example, as the vehicle ascends a steep grade before cresting a hill, the vehicle's speed might lag behind the cruise set speed. Subsequently, the vehicle begins descending the grade on the other side of the crest, and the vehicle begins to accelerate due to gravity. Nevertheless, the cruise control system maintains engine power in an attempt to reach the cruise set speed, and the vehicle unnecessarily expends fuel. Further, the vehicle typically overshoots the cruise set speed, so the driver must brake. As a result, under these conditions, traditional cruise control systems waste fuel and increase brake wear.

To reduce costs associated with traditional cruise control system inefficiency, an organization may institute a training program advising drivers to either suspend cruise control operation or adjust the cruise set speed under certain specified conditions. However, drivers may fail to so act because they face a variety of other tasks when driving. In addition, an inexperienced driver may fail to suspend the cruise control system because the driver simply does not assess terrain conditions properly. Finally, the training program itself requires costs possibly outweighing any savings gained.

SUMMARY OF THE INVENTION

The invention provides a system and related methods for monitoring terrain grades encountered by a vehicle. Upon determining the vehicle has encountered a particular type of terrain, the system performs a terrain adaptive action. For example, the system provides an alert to a driver (e.g., a driver message) or modifies a vehicle system (e.g., the cruise control system).

In one embodiment, the system generates an alert when the system determines the vehicle is cresting a hill. First, the system determines if the vehicle has climbed a substantial grade as indicated by significant increase in elevation and lag behind the cruise set speed. Then, after the system detects a sustained increase in the rate of the vehicle's acceleration for a substantial period, the system determines the vehicle is cresting the hill. The system then provides the alert to the driver (e.g., in the form of a driver message), advising reduction of the cruise set speed.

In another embodiment, the system automatically modifies the cruise set speed without driver intervention. The driver can subsequently reset (i.e., resume) the cruise set speed by pressing a resume switch.

In yet another embodiment, the system automatically sets the cruise set speed to the current speed without driver intervention; subsequently, the set speed is automatically upwardly adjusted as the vehicle accelerates. The set speed is capped at its original value.

The system supports a fuzzy logic feature in which a degree of confidence value is maintained to indicate with what certainty the system has determined the vehicle is cresting a hill. The degree of confidence value is increased and decreased according to an increase-in-acceleration rule. Once the degree of confidence value reaches a target degree of confidence value, the system takes a terrain adaptive action.

Some of the illustrated implementations include various features to increase performance. For example, some of the parameters monitored by the system can be smoothed (e.g., with an averaging function) for more accurate analysis.

Several benefits result from the arrangement provided by the invention. Since a downward grade may follow the crest of a hill, the system can employ gravity to accelerate the vehicle rather than expending extra engine power. Thus, the system avoids unnecessarily expending fuel or overshooting the cruise set speed. As a result, the system increases fuel economy and avoids brake wear, reducing costs associated with vehicle operation and maintenance. Such benefits are particularly useful in the field of long-haul trucks.

Further advantages and features of the invention will become apparent with reference to the following detailed description and accompanying drawings.

DETAILED DESCRIPTION

The following sections describe an implementation of a terrain adaptive cruise control system. The system is implemented in a programmable control unit that monitors vehicle performance parameters and performs a terrain-adaptive action when the system determines the vehicle is cresting a hill.

The terrain-adaptive action can be an alert provided to the driver or executable instructions to reset the cruise set speed automatically without driver intervention. The System Architecture section describes how an electronic control unit interfaces with an instrumentation control unit; a description of how the system determines the vehicle is cresting a hill follows. In the described embodiments, logic for monitoring parameters resides in the instrumentation control unit of a truck; however, the logic could reside in an alternative location (e.g., in the engine electronic control unit). Accordingly, the terrain adaptive cruise control system could be bundled with an engine, an instrumentation control unit, or some other component of the truck.

The System Architecture

Figure 1:
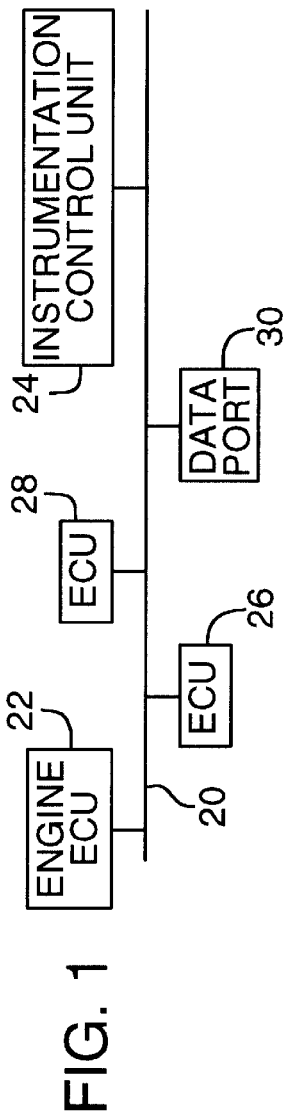
FIG. 1 is a block diagram illustrating the system architecture in a truck for one embodiment of the invention.

FIG. 1 is a block diagram illustrating the system architecture of electronic control units in a truck used to monitor vehicle performance data in an embodiment of the invention. The system architecture includes a number of electronic control units (ECUs) interconnected via a data link 20. In particular, the system shown in FIG. 1 includes an engine ECU 22 located at the engine, and an instrumentation control unit 24, located at the dash of the truck. As shown, other optional ECUs 26, 28 can be connected to the data link 20. Finally, the system includes an optional data port 30, for coupling external data processing equipment to the ECUs on board the truck.

The Engine Control Unit

Figure 2:
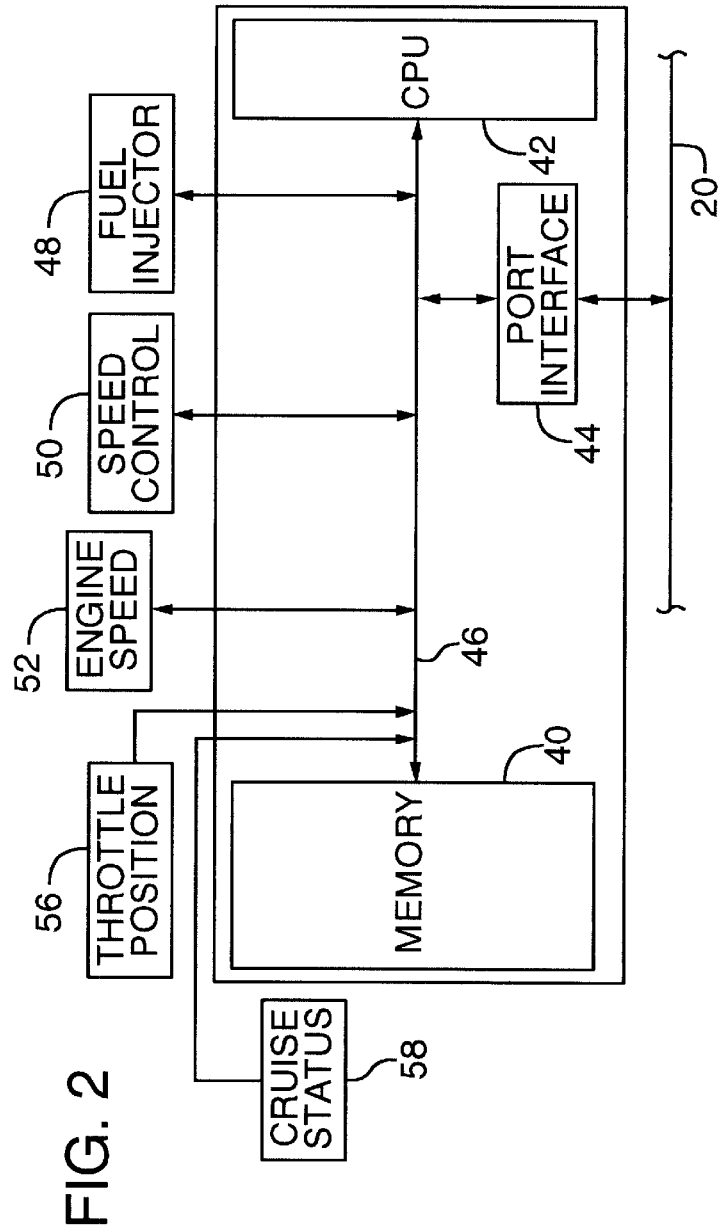
FIG. 2 is a block diagram illustrating the engine electronic control unit (ECU) in more detail.

FIG. 2 is a block diagram illustrating the engine ECU used to collect vehicle performance data in the system shown in FIG. 1. The engine ECU includes memory 40, a CPU 42, and a port interface 44 connected via a bus structure 46. The CPU 42 executes routines stored in the memory 40 to control and monitor engine performance. The port interface 44 serves as a link between the CPU 42 and a serial communication path called the data link 20.

The engine ECU also includes a variety of sensors and controls used to monitor and control the engine. This implementation of the ECU includes several sensors that monitor vehicle performance, including a sensor in speed control 50, an engine speed (RPM) sensor 52, a throttle position sensor 56 and a cruise status sensor 58. In this implementation, the engine ECU controls the fuel rate by issuing control signals to a fuel injector 48 that controls the flow of fuel to the engine's cylinders.

The engine ECU in this embodiment is also responsible for measuring and computing the vehicle's road speed. The speed control 50 senses the speed of rotation of the tail shaft of the transmission and converts it into road speed. A magnetic sensor located on the tail shaft generates an analog signal comprised of a series of pulses representing the rotation rate of the tail shaft or drive shaft. This analog signal is converted into a digital signal. The engine ECU is programmed to read this digital signal and derive the instantaneous vehicle speed in miles per hour. An alternative way to measure speed would be to monitor a value provided by a radar system or an antilock braking system (ABS) monitoring a wheel's rotation.

The engine ECU 22 is responsible for monitoring a variety of other performance parameters, including engine speed. These parameters can be transferred to the instrumentation control unit 24 over the data link 20. Other values can be derived from these parameters as needed. For example, an acceleration variable is derived from engine speed, vehicle road speed, or both.

The Instrumentation Control Unit

Figure 3:
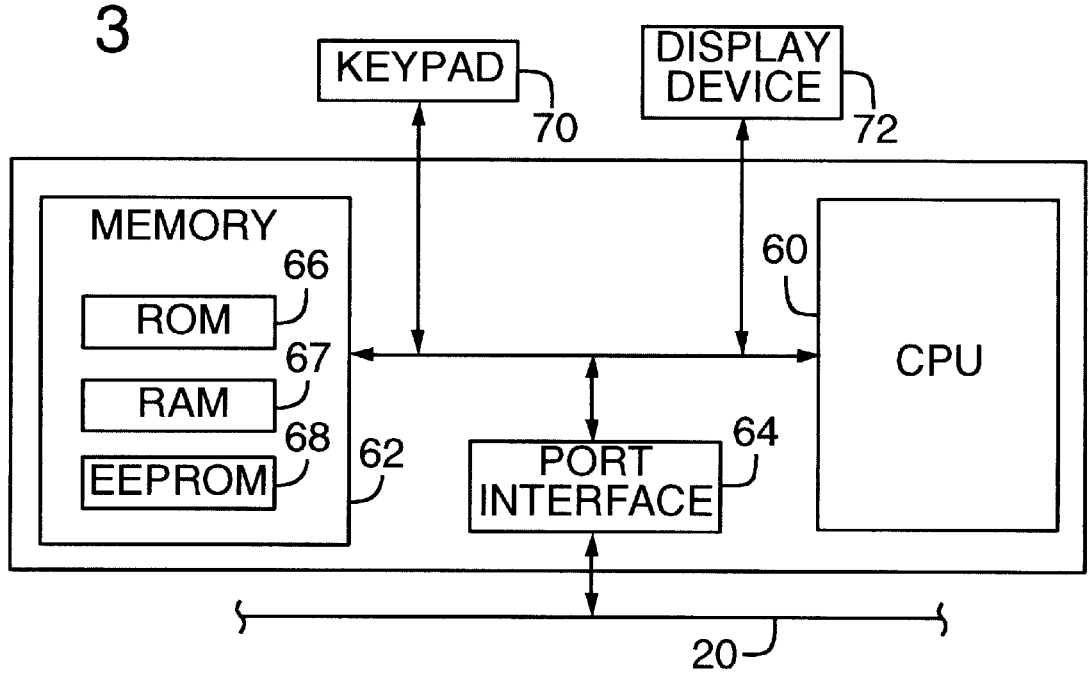
FIG. 3 is a functional block diagram illustrating the architecture of the instrumentation control unit (ICU).

FIG. 3 is a functional block diagram illustrating the architecture of an instrumentation control unit (ICU), which controls the terrain adaptive cruise control. Alternatively, an ECU (e.g., engine ECU 22) can be used to control the system.

The instrumentation control unit comprises a CPU 60, memory 62, and a port interface 64 for connecting the unit to the data link 20. The memory 62 includes programmable ROM (EEPROM) 66, RAM 67, and permanent ROM 68. The routines for controlling the ICU are stored in ROM 68, while re-configurable data is stored in the EEPROM 68.

In one specific implementation, the ICU includes a 68HC11 microprocessor from Motorola Corporation, and its memory 62 comprises EEPROM, ROM, and RAM. This specific ICU has 8 KB of external EEPROM, 128K of ROM and 2K of RAM. The internal memory of the CPU comprises 256 bytes of RAM and 512 bytes of EEPROM. This is only one specific implementation of the ICU. A variety of conventional processors and memory systems can be used to implement the functionality of the instrumentation control unit.

Preferably, the processor used in the ICU should be a 16 bit processor. The processor used in the current implementation was selected to have sufficient speed and memory to be able to calculate vehicle parameters and analyze the parameters to predict upcoming terrain once every 200 milliseconds. This is not an absolute requirement, however, since the analysis can be varied to work at other calculation rates.

The ICU also preferably includes an input device 70 and a display device 72. In one implementation, the input device is a ten key keypad 70, but the specific design of the input device can vary. The display device 72 provides a textual and graphical output to the driver. In one specific implementation, the display device comprises a two line by 20 character vacuum fluorescent display.

The particular ICU used in this implementation is manufactured by Joseph Pollak Corporation of Boston, Mass. for Freightliner Corporation. The instrumentation control unit is presently available as a replacement part from Freightliner Corporation.

The Data Link

The data link 20, in this implementation, is a serial communication path connecting the ECUs together. This particular data link is designed according to SAE J1708, a standard for serial data communication between microcomputer systems in heavy duty vehicle applications. While this specific embodiment is based on the J1708 standard, it is not critical that the invention be implemented in this specific manner. One possible alternative is to use a data link constructed according to SAE J1939. The communication link need not be a shared communication path. It is also possible to connect vehicle parameter sensors (i.e., for road speed, fuel rate, engine speed, torque, etc.) directly to the ICU via discrete wiring.

In the embodiment shown in FIG. 1, the data link 20 is comprised of a twisted pair cable operating at 9600 baud. Designed according to the SAE J1708 standard, the data link forms a communication channel among the electronic control units coupled to it. Electronic control units generate a digital signal on the data link by applying a voltage differential between the two wires in the cable. A voltage differential above a specified threshold represents a logic high value, while a voltage differential below a specified threshold represents a logic low value. This type of data link is particularly advantageous for hostile environments because the signal is more robust and impervious to signal degradation. However, other alternative communication media could be used in place of the J1708 cable.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines one format for data and messages communicated among microprocessors connected to a shared data link, and is specifically adapted for use with SAE J1708.

According to SAE J1708/J1587, the ECUs on the data link communicate by passing messages to each other. The ECUs can be either receivers, or receivers and transmitters. In this particular implementation, the instrumentation control unit and the engine ECU are both transmitters and receivers. For the purpose of monitoring vehicle performance data, the engine ECU acts as a transmitter, sending messages to the ICU regarding road speed, fuel rate, engine torque, engine speed, engine state, etc.

In the J1587 standard, a message includes the following: 1) a module ID (MID), 2) one or more parameters (the message data), and 3) a checksum. The number of parameters in a message is limited by the total message length defined in the SAE J1708 standard. The message identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs convey information about one or more parameters contained within the messages.

According to the SAE J1587 standard, the first character of every parameter is a parameter identification character (PID). The parameter identified by the PID directly follows the PID. The SAE J1587 supports different data formats including a single character, a double character, or more than two data characters representing the parameter data. Several parameters can be packed into a message, limited by a maximum message size.

Again, in this implementation, the ECUs communicate with each other over the data link according to the SAE standard J1708. The standard describes methods for accessing the data link and constructing messages for transfer over it. It also defines a method for resource contention among the ECUs on the data link.

An ECU wishing to transmit data on the data link first waits for a lull in transmission of data on the data link. In this particular implementation, the length of the lull is 200 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases, two or more transmitters may attempt to broadcast a message at one time, giving rise to a collision. To resolve a conflict among transmitters, messages have a priority according to their message identifiers. The MIDs of higher priority transmitters have a greater number of bits set at a logic level one. When more than one message is broadcast at a time, the more dominant message takes priority over lesser dominant messages. Since a lower priority message is blocked by a higher priority message, the transmitter of the lower priority message must wait and retransmit the message after another lull. An ECU on the data link will continue to attempt to send a message until it is successfully broadcast to the data link.

As introduced above, the ICU obtains vehicle performance data from the data link and uses selected parameters to predict upcoming terrain. Table 1 summarizes various parameters from the J1708 data link that the ICU uses to determine when the vehicle is cresting a hill.

TABLE 1

| Parameter | Description |
| --- | --- |
| PID 84 | Road Speed |
| PID 85 | Cruise Control Status. Bit eight is one if cruise control is activated and zero if cruise control is off. |
| PID 190 | Engine Speed |

Computer-Executable Instructions and Computer-Readable Media

The invention is described below as implemented with reference to acts and symbolic operations that are performed by various control units interconnected via the data link 20 (FIGS. 1–3). Such acts and operations are sometimes referred to as being computer-executed and include operations performed in application-specific integrated circuits or other hardware.

The acts and symbolically represented operations include the manipulation by a processing unit of electrical signals representing data bits which causes a resulting transformation or reduction of the electrical signal representation, and the maintenance of data bits at memory locations in the memory system (including the RAM, hard disks, floppy disks, and CD-ROMs) to thereby reconfigure or otherwise alter the computer system's operation, as well as other processing of signals. The memory locations where data bits are maintained are physical locations that have particular electrical, magnetic, or optical properties corresponding to the data bits.

The acts and operations performed in accordance with the invention can be stored in a variety of computer-readable media. For example, during processing by a central processing unit (e.g., the CPU 42 of FIG. 2), the acts and operations might be stored in memory (e.g., the memory 40 of FIG. 2) as computer-readable instructions and related data. Computer-readable media include media for distributing the instructions and related data, such as a hard disk, a floppy disk, a CD-ROM, and flash ROM.

Terrain Adaptive Cruise Control System

The system architecture described above is used to implement a terrain adaptive cruise control system. In some embodiments, the system provides a driver alert, notifying the driver to take an action. In other embodiments, the system automatically modifies operation of the cruise control to avoid excess fuel consumption and braking.

Figure 4:
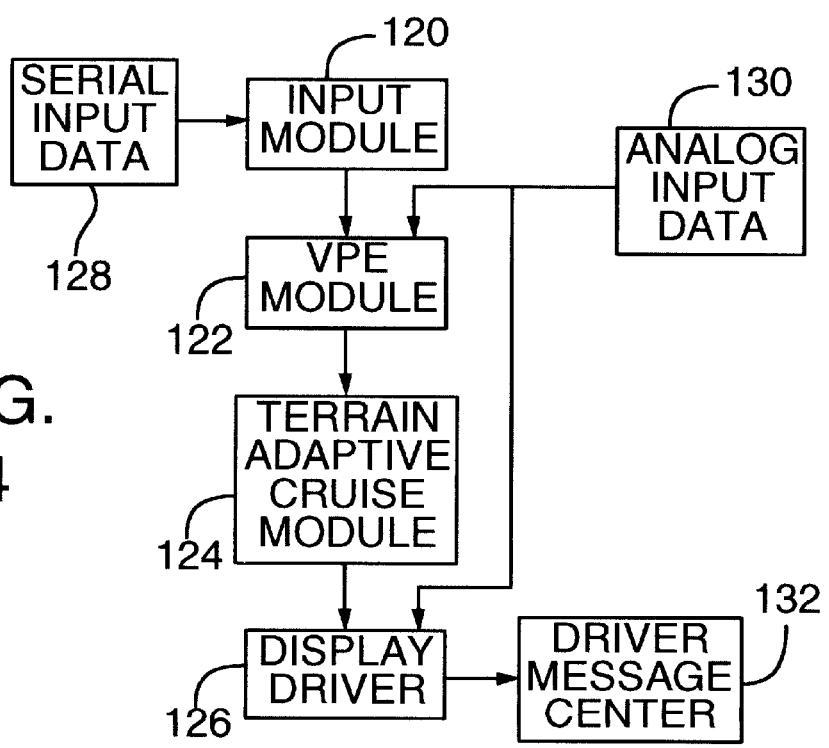
FIG. 4 is a block diagram illustrating modules used to analyze various vehicle parameters and predict when the vehicle is cresting a hill in one embodiment of the invention.

One implementation of the terrain adaptive cruise control system comprises four software modules executing from memory on the ICU. FIG. 4 is a block diagram illustrating these modules. The following four modules are executed repetitively to predict when the vehicle is cresting a hill:

1. Input 120
2. Vehicle Parameter Estimation 122
3. Terrain Adaptive Cruise 124
4. Display Driver 126

This arrangement represents only one implementation of the invention; the implementation can vary depending on a number of factors, such as the type and architecture of the performance monitoring devices in the vehicle, the type of vehicle (long haul tractor trailer truck, business class truck, car, etc.) the terrain analyzed, etc.

The Input Module

The input module 120 converts serial input data 128 from the serial data bus into an array of asynchronous numeric values, which are updated as new messages are received. In this way, various vehicle performance parameters are available in an array in the ICU for monitoring. For example, the vehicle's road speed (PID 84) is stored in the array at a location accessible to the other modules.

Receipt of selected messages from the engine control unit is used to indicate 100 millisecond, 200 millisecond and one second time intervals. These time intervals are used to signal the arrival of new data and clock several of the subsequent modules.

The Vehicle Parameter Estimation Module

The described embodiment of the invention operates in conjunction with a Vehicle Parameters Estimation (VPE) module. The VPE module 122 estimates the vehicle's weight (GCW), aerodynamic drag factor (Beta) and the gradient (Grade) of the roadway. These estimates are variables derived from information available from electronically-controlled engines and an analog signal from the engine fan clutch (analog input 130). The variables are updated once per second and recorded in memory for use by the other modules. Further detail on the VPE module is available in U.S. patent application Ser. No. 08/982,117 to Ehlbeck et al. entitled, "Fuel Use Efficiency System for Assisting the Driver to Improve Fuel Economy," which is hereby incorporated by reference. The terrain adaptive cruise control system could alternatively be used alone or in combination with modules other than the VPE module.

The Terrain Adaptive Cruise Module

The terrain adaptive cruise module 124 analyzes variables from the VPE module 122 and vehicle performance parameters from the input module 120 to analyze terrain grade and take an appropriate terrain-adaptive action. In the illustrated implementation, the terrain adaptive cruise module 124 loops through a series of instructions, performing an iteration of the loop every 200 milliseconds to determine when the vehicle is cresting a hill and provide an appropriate alert. Any module for analyzing parameters could be used in place of the described terrain adaptive cruise module.

The Display Driver Module

Figure 5A:
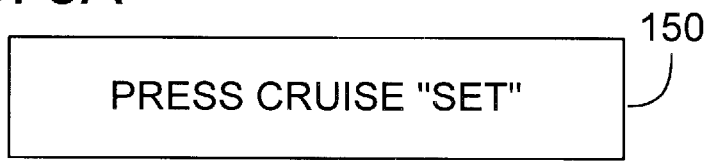
FIG. 5A is a diagram of a display message generated by the ICU in FIG. 3 to display a driver message alerting the driver to set the cruise set speed.
Figure 5B:
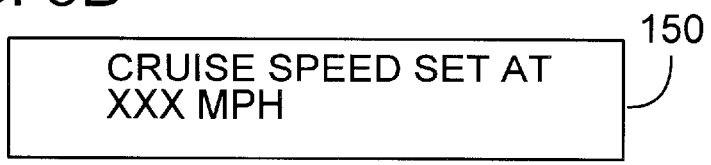
FIG. 5B is a diagram of a display message generated by the ICU in FIG. 3 to display another driver message advising the driver the cruise set speed has been set.

The display driver module 126 tracks messages for displaying on the driver message center 132. Sample messages are shown at FIGS. 5A and 5B. The driver message center 132 alternatively could be implemented to provide audio alerts to the driver in place of or in addition to visual alerts.

The Cruise Control Interface

The terrain adaptive cruise control system can work in conjunction with a variety of cruise control interfaces. A typical interface provides a way for the driver to activate the cruise control system (e.g., an "on" setting), set the cruise set speed, and activate a resume option.

For example, pressing a "set" switch sets the cruise set speed to the vehicle's current road speed. If the driver brakes, the current set speed is stored as a resume speed. Subsequently, when the driver presses a "resume" switch, the cruise set speed is set to the resume speed. In this way, the driver can easily return to the selected speed. Preferably, the cruise control interface is positioned to allow easy accessibility by the driver, such as near the steering column or in the transmission control.

Cruise Set Speed

When activated, a typical cruise control system essentially serves as a speed control system; the cruise control system operates to apply appropriate engine power to maintain the vehicle's road speed at the cruise set speed. In the illustrated embodiment, the cruise control system allows the cruise set speed and the resume speed to be modified independently of each other. When a resume request is received (e.g., from the driver or from the ICU), the cruise set speed is set to the resume speed.

Input Parameters

To facilitate system tuning, certain values are maintained as input parameters. Input parameters are variables ordinarily set to a predetermined value and not altered during operation of the vehicle. However, input parameters can be modified to tune the system.

For example, the illustrated fuzzy logic system monitors vehicle acceleration to determine if it has exceeded a particular threshold. The threshold is implemented as an input parameter, which typically remains constant unless explicitly modified. Modification can be accomplished, for instance, by an external computer connected to data port 30 (FIG. 1). Alternatively, input parameters could be implemented as variables in a self-tuning system.

Overview of Operation

The system described in the following sections analyzes vehicle performance parameters, input parameters, and variables to determine when the vehicle is cresting a hill. When such a determination is made, the system can take a variety of actions to improve fuel economy and decrease braking and brake wear. For example, in one implementation, when the system determines the vehicle is cresting a hill, it displays a message indicating the driver should press cruise "set," as shown in FIG. 5A. Pressing "set" avoids wasting engine power and instead allows gravity to accelerate the vehicle as it descends a downward grade. The system can alternatively take other actions to improve fuel economy and decrease braking and brake wear as described in more detail below.

Figure 6:
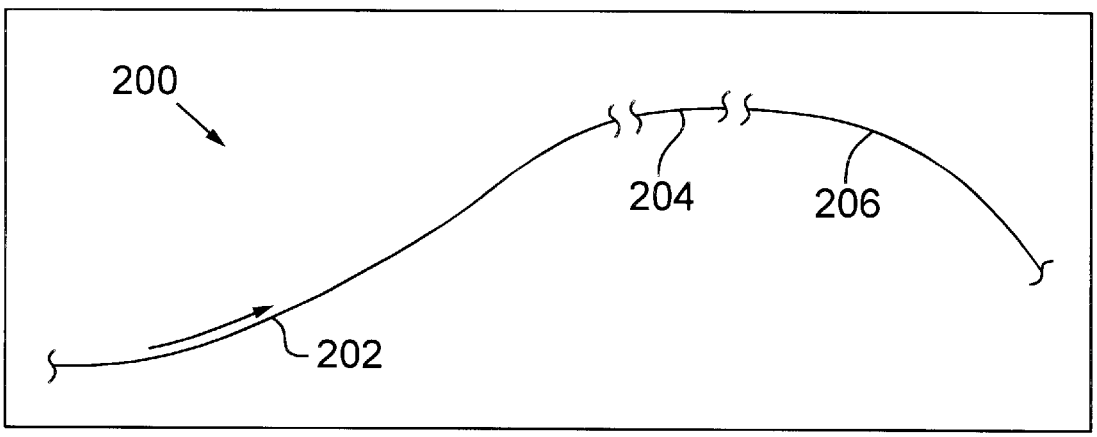
FIG. 6 is a diagram showing exemplary terrain analyzed by a terrain adaptive cruise control system.

FIG. 6 illustrates terrain 200 a vehicle might encounter while its cruise control system is active. As the vehicle climbs the terrain segment 202, it is climbing an upward grade; if the grade is steep enough, the vehicle's road speed will lag behind the cruise set speed as the vehicle gains elevation.

Eventually, the vehicle reaches terrain segment 204; the vehicle's road speed will substantially consistently accelerate as it approaches the terrain segment 206. The vehicle is cresting a hill somewhere in the segments 204 and 206. If an appropriate action is taken in the cruise control system (e.g., reducing the cruise set speed) when the vehicle is cresting (or is about to crest or has recently crested) the hill, the vehicle can take advantage of gravity for acceleration as the vehicle descends the downward grade of terrain segment 206.

Figure 7:
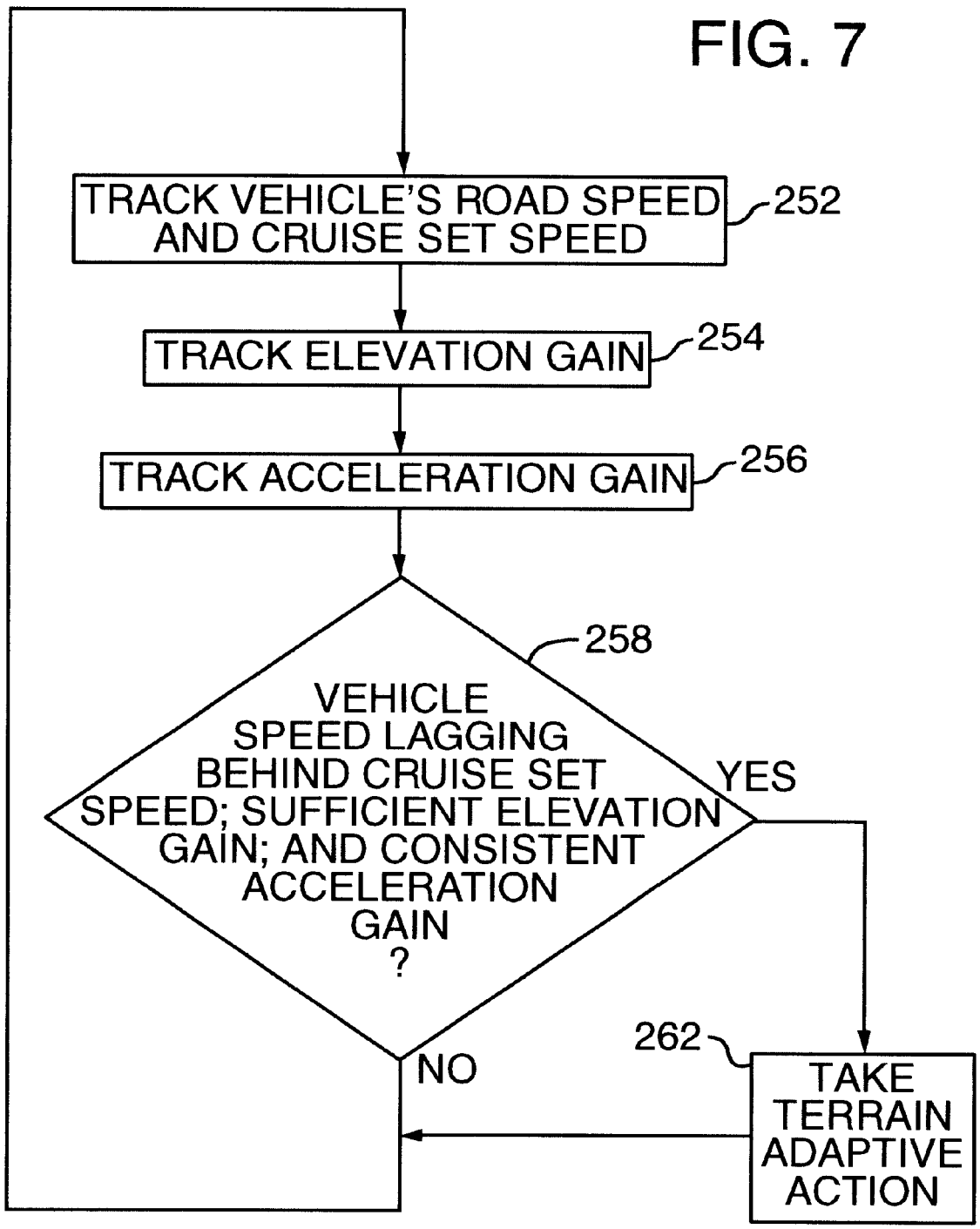
FIG. 7 is a flow diagram showing an overview of a terrain adaptive cruise control system.

Accordingly, one implementation illustrated at FIG. 7 tracks the vehicle's road speed and cruise set speed (step 252), tracks elevation gain (step 254), and tracks acceleration gain (step 256) by periodically computing variables from the vehicle performance parameters. The system can then determine if the vehicle's road speed is lagging behind the cruise set speed; whether there was sufficient elevation gain; and whether the vehicle's acceleration has been substantially consistently increasing (step 258). If so, it is determined that the vehicle is cresting a hill, and a terrain adaptive action is taken (e.g., adjusting the cruise control) (step 262).

Actual terrain typically deviates from the simplistic terrain shown in FIG. 6. Accordingly, in a preferred implementation, the system maintains a fuzzy logic variable, which represents a degree of confidence with which the system has determined the vehicle is cresting a hill. Generally, the variable indicates continuous increases in vehicle acceleration after the vehicle has climbed a substantial grade. When the variable exceeds a certain predetermined threshold, the system has determined with sufficient certainty that the vehicle is cresting a hill, and a terrain-adaptive alert is generated to modify the cruise set speed.

Specifically, the variable is kept at zero until the system determines the vehicle has begun to climb a grade, as evidenced when the vehicle's road speed lags behind the cruise set speed. At such time, the system considers other variables and consults an increase-in-acceleration rule to determine whether the fuzzy logic variable should be increased or decreased. Certain circumstances may cause the variable to be cleared (i.e., set to zero).

The advantage of the illustrated degree of confidence approach is that it incorporates multiple acceleration observations into a single variable, which can be monitored to determine when to take a terrain adaptive action. Minor variances in terrain grade or other factors (e.g., road conditions or wind) result in a decrease in the degree of confidence variable, but will not necessarily set it to zero. Thus, the illustrated approach is robust enough to withstand minor variances while still tracking whether substantially continuous increases in acceleration have been observed.

Figure 8:
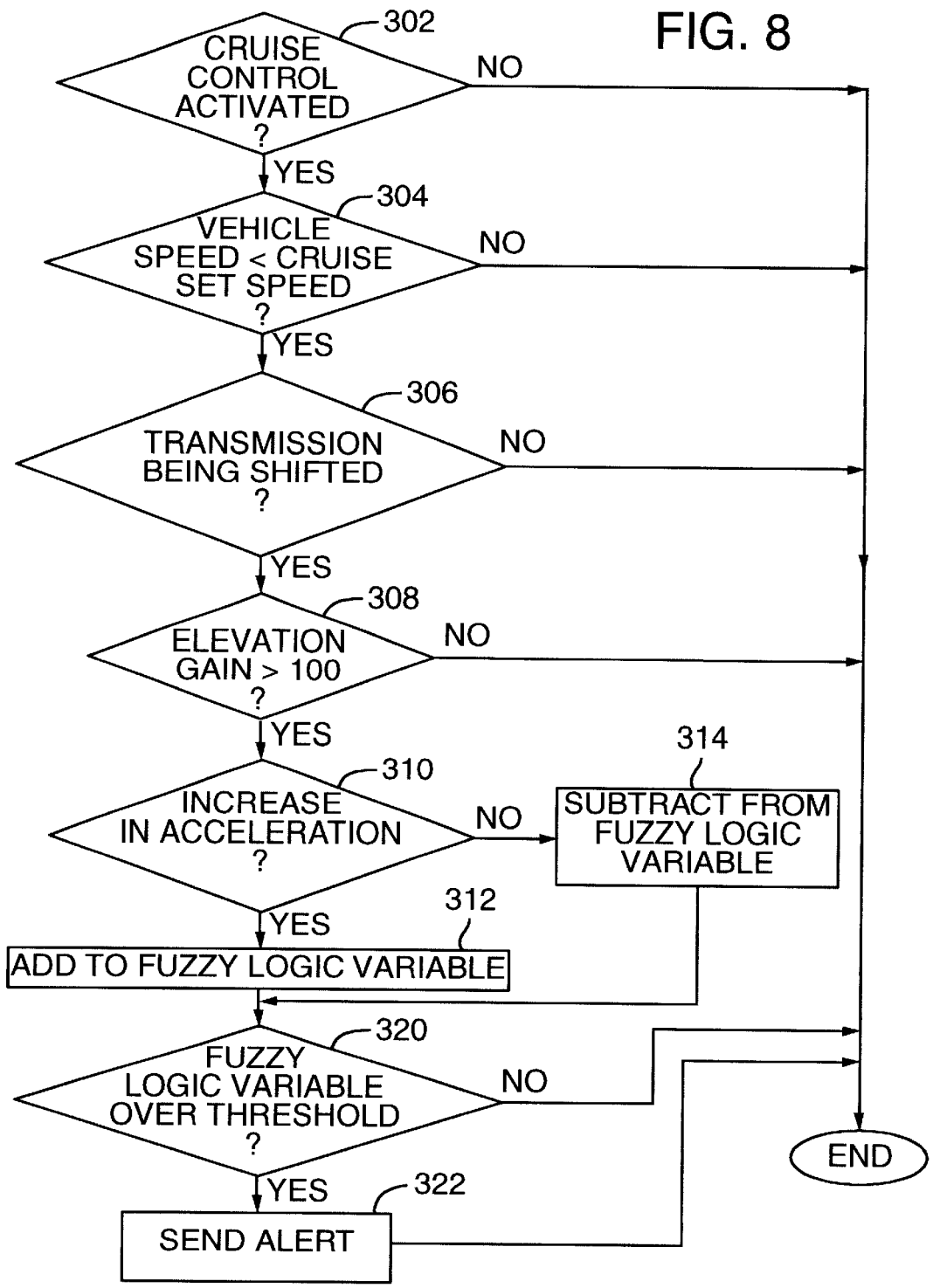
FIG. 8 is a flow diagram showing an overview of a fuzzy logic system for use in a terrain adaptive cruise control system.

For example, an implementation shown in FIG. 8 checks to see if the cruise control system is active (step 302), whether the vehicle speed is lagging behind the cruise set speed (step 304), whether the transmission is being shifted (step 306), and whether the vehicle has gained a particular amount of elevation (step 308). Depending on the outcome of its analysis, the system then determines whether there has been an appropriate predetermined acceleration gain (step 310). If so, the fuzzy logic variable is incremented (step 312); otherwise, the variable is decremented (step 314). If the fuzzy logic variable exceeds the threshold (step 320), the system sends an alert (step 322). In the illustrated embodiment, the threshold is set to a predetermined integer (e.g., 9); however, the threshold could be implemented as an input parameter to facilitate system tuning. The fuzzy logic system can also be tuned by adjusting the predetermined acceleration gain, which in a preferred embodiment is represented by a pair of input parameters. For example, decreasing the predetermined acceleration gain would make the system more sensitive to acceleration gains when determining whether the vehicle is cresting a hill.

Although the illustrated exemplary embodiment uses a single value to represent the degree of confidence, other arrangements could be used. For example, a system might additionally track the number of observations represented by the fuzzy logic variable in a two-value system.

Figure 9:
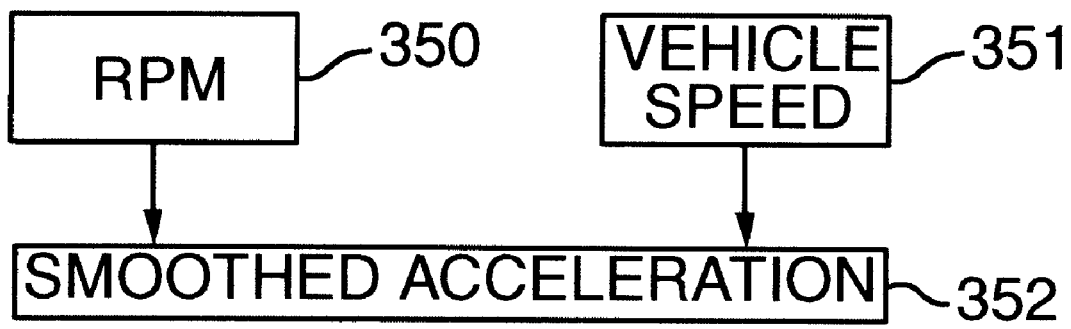
FIG. 9 is a data flow diagram showing variable smoothing in a terrain adaptive cruise control system.
Figure 15:
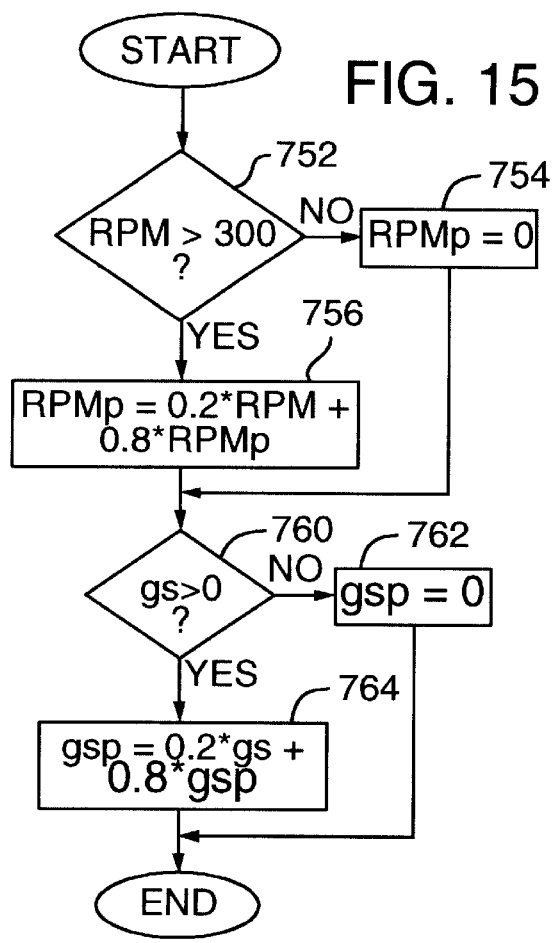
FIG. 15 is a flow diagram showing method for smoothing variables in a terrain adaptive cruise control system.

A preferred implementation further performs variable smoothing to avoid data aberrations and errors caused by low resolution of certain parameters. For example, a general implementation of smoothing is shown in FIG. 9 (a more specific implementation is shown in FIG. 15). The system produces a smoothed acceleration variable 352 by combining RPM 350 and vehicle speed 351. Smoothing can be achieved in a variety of ways. For example, a prior value for a variable can be tracked and combined with the current value of the variable using a weighted average function. During smoothing, certain threshold values may be enforced; if a variable falls below the threshold, the prior value is cleared.

An alternative way of describing the system is in terms of an acceleration signature. The system generates a signature representing a picture of the vehicle's acceleration over time by taking successive, periodic snapshots of various performance parameters and combining them into the signature. The signature thus includes a time component and represents multiple acceleration observations.

A specimen acceleration signature represents a set of observations (actual or theoretical) over time indicative of cresting a hill. For example, a series of constantly increasing acceleration observations indicates cresting a hill if observed after the vehicle's speed lags behind the cruise set speed. The specimen acceleration signature can be represented in a variety of ways, such as by specifying a value or values considered to be a sufficient increase in acceleration, essentially specifying the slope of a line. However, an implementation might specify a specimen signature in an alternative way, such as an exponentially increasing line.

During vehicle operation, an observed acceleration signature is compared with the specimen signature. In the illustrated embodiments, these signatures are tailored to measure increases in acceleration and can thus be called "increase-in-acceleration signatures." If the signatures match with a certain degree of confidence, the system indicates the vehicle is cresting a hill. Although a strict match may be observed in some instances, an algorithm tolerating typical variations in terrain and road conditions is preferred. The degree of confidence can be varied to tune the system and increase its performance.

Software Description

Figure 10:
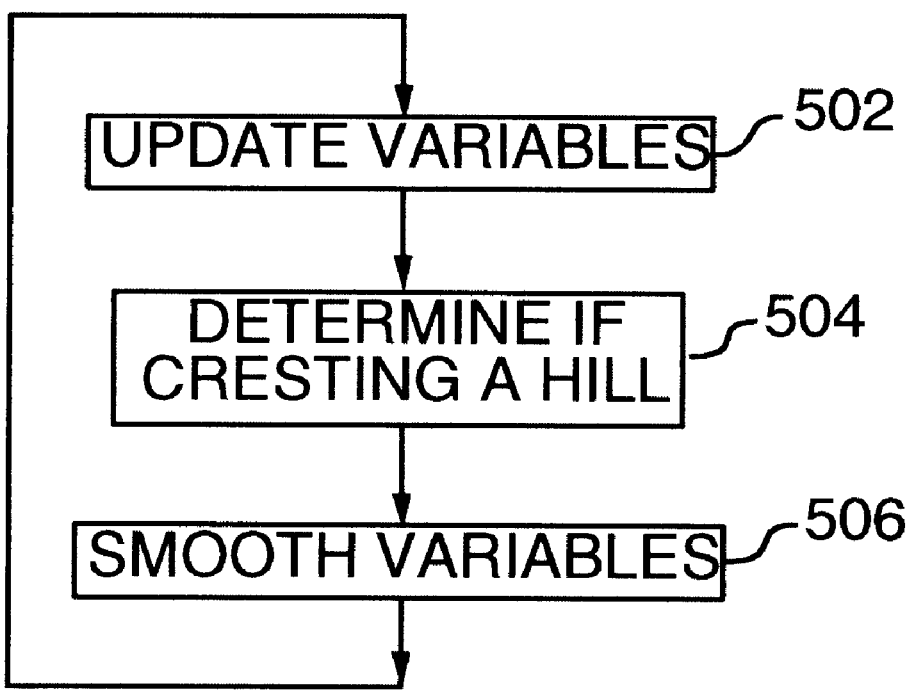
FIG. 10 is a flow diagram showing an overview of a detailed implementation of a terrain adaptive cruise control system.

The following describes an exemplary implementation of the terrain adaptive cruise control system in more detail. An overview of a method employed by the system is shown in FIG. 10. The system monitors various vehicle performance parameters and derives various variables (step 502), analyzes the variables to determine when the vehicle is cresting a hill (step 504), and smoothes the variables (step 506) in a repeating loop. In the illustrated embodiment, these steps are executed repeatedly every 200 milliseconds. An alternative implementation might perform the steps in some other order or combine the steps. For example, variables could be smoothed during parameter monitoring.

Variables

During operation, the system maintains a variety of variables as shown in Table 2. In some cases, the variables serve a variety of functions not strictly described by the names in Table 2. For example, as variables are calculated during successive iterations of the loop (steps 502, 504, and 506), the "previous" value of certain variables (e.g., RPM) are stored in variables whose last letter is the letter "p" (e.g., RPMp). Under certain conditions, these "previous" values may be manipulated so that they do not contain the previous value of the variable in a strict sense.

TABLE 2

| Variable | Description |
|---|---|
| Cruise | value of bit eight of PID85: one if cruise control is activated (on) and zero if cruise control is inactive (off). |
| CSMPH | the cruise set speed in miles per hour. If cruise control is not activated, the value of CSMPH is zero. |
| CSp | the cruise set speed from the previous iteration. The initial value of CSp is zero. CSp is then set dynamically at the start of each iteration before CSMPH is updated with current values. |
| Delev | change in vehicle's elevation (in feet) since last zeroed. Initial value is zero. |
| ggain | an input parameter which specifies the percentage amount of increase in the acceleration needed to indicate that the vehicle is nearing the crest of a vertical curve. In the current implementation, this value is set to 1.04. |
| gLim | an input parameter which specifies an absolute acceleration which indicates that the vehicle is nearing the crest of a vertical curve. In the current implementation, this value is set to 0.05. |
| Gr | Grade of the roadway in percent as estimated by the Vehicle Parameters Estimator (VPE) algorithm. VPE operates asynchronously to the terrain adaptive cruise control system and estimates the vehicle's gross weight, aerodynamic drag and the grade of the roadway on which the vehicle is currently operating. |
| gs | the acceleration of the vehicle when the specified conditions are met. Otherwise, gs is set equal to zero. Calculated using RPM - RPMp to utilize the increased speed resolution provided by PID 190. |
| gsp | digitally smoothed previous iteration vehicle acceleration (in g's) calculated recursively as shown in FIG. 15. If the current vehicle acceleration is not greater than zero, the value of gsp is set equal to zero, its initial startup value. |
| LSLim | Low Speed Limit, a low speed cut out value in miles per hour. Initially set to 25 mph. |
| MPH | derived vehicle road speed in miles per hour. |
| PCM | previous cruise message. PCM equal to zero corresponds to no cruise message during the previous iteration. PCM equal to one corresponds to a change in the cruise set speed since the previous iteration. PCM equal to two corresponds to a current terrain adaptive cruise event. This variable serves to sustain display of a driver message. |
| PID | an array which contains the most recent information for PIDs 0 through 253 from the J1587/1708 data bus for MID 128 (Engine). This array is updated by the INPUT module 120 and serves as a parameter store. |

TABLE 2-continued

| Variable | Description |
|---|---|
| RPM | derived vehicle engine speed in revolutions per minute |
| RPMp | digitally smoothed previous iteration engine RPM calculated recursively as shown in FIG. 15. If the current engine RPM is not greater than 300 revolutions per minute, the value of RPMp is set equal to zero (i.e., the initial startup value). |
| RSI | ratio shift indicator; set to 1 when transmission is not being shifted (i.e., the ratio of the derived vehicle road speed divided by the engine RPM is nearly constant). |
| TAC | fuzzy logic global variable used to determine if the vehicle is about to encounter a downgrade. The initial or startup value of TAC is zero. |
| VEr | Vehicle Engine ratio. Initial value is set at 0.03. |
| VErp | "previous" value of VEr from previous iteration. VErp is set dynamically by reading VEr from memory at the start of each iteration before VEr is updated with current values. |

Updating the Variables

Figure 11:
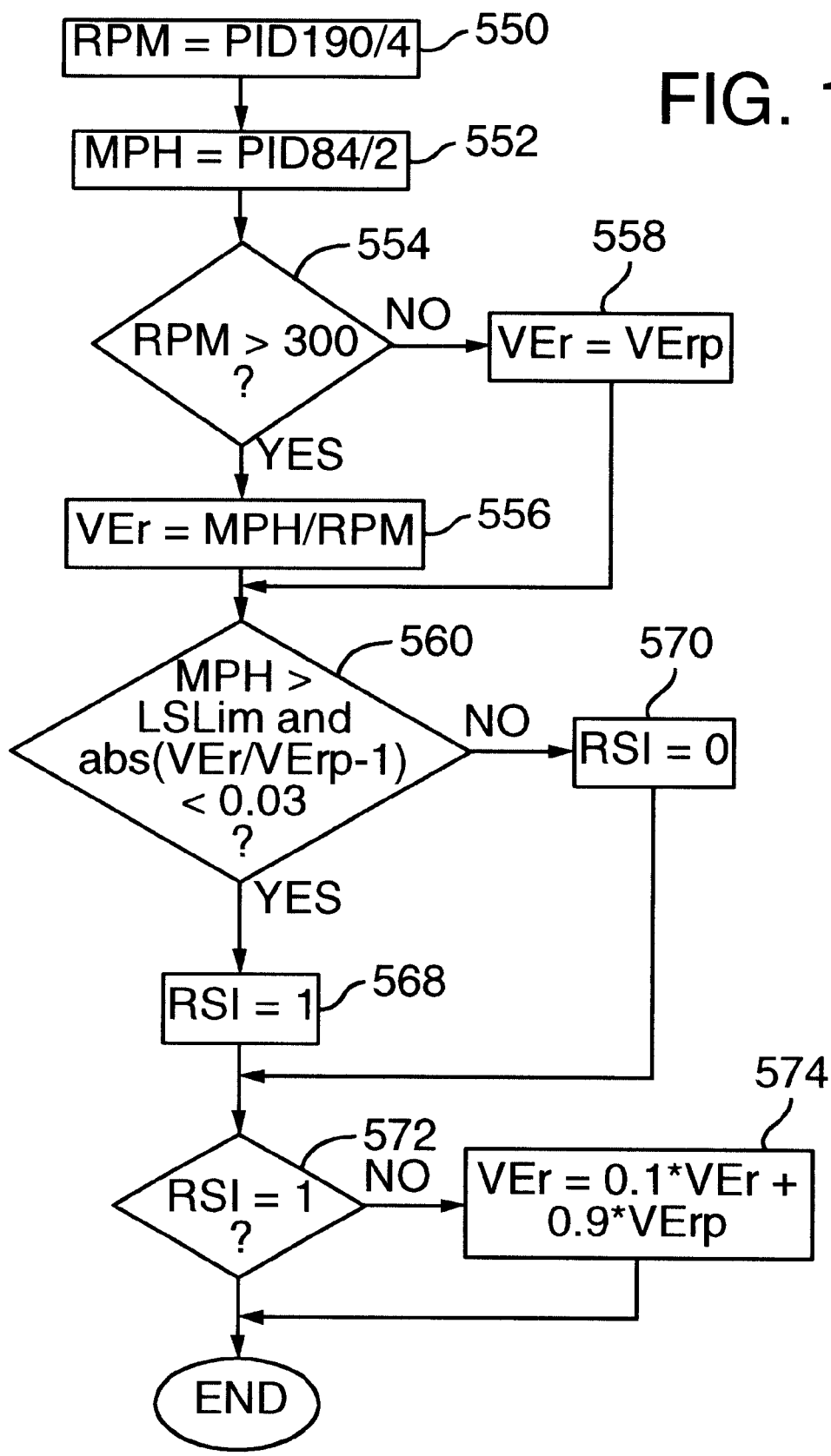
FIG. 11 is a flow diagram showing a method for updating variables in a terrain adaptive cruise control system.

Detailed steps for updating variables relating to the terrain adaptive cruise control system are shown at FIG. 11. Backus-Naur Form (BNF) notation is used to represent derivation of some variables. In BNF notation, the expression "X=A>B?Y:Z" represents "if (A>B) X=Y else X=Z."

The derived vehicle engine speed variable is calculated by dividing PID 190 (vehicle engine speed) by 4 (step 550). The derived vehicle road speed variable is calculated by dividing PID 84 (vehicle road speed) by 2 (step 552).

The vehicle engine ratio is then calculated as follows. The derived vehicle engine speed is checked to see if it is greater than 300 RPM (step 554). If so, VEr is set to the derived vehicle road speed divided by the derived vehicle engine speed (step 556); if not, VEr is set to the previous value, VErp (step 558).

The ratio shift indicator is then calculated as follows. If the derived vehicle road speed is greater than the low speed limit and the vehicle engine ratio has not changed by more than 3% (step 560), RSI is set to 1 to indicate the transmission is not being shifted (step 568); otherwise RSI is set to 0 to indicate the transmission is being shifted (step 570).

If the transmission is not being shifted (step 572), the vehicle engine ratio is calculated as a weighted average between the current value and the value during the previous iteration, with a 10% and 90% weighting, respectively (step 574). The average operates to provide a smoothed value for the vehicle engine ratio.

The preceding steps can be represented using BNF notation as follows:

RPM=PID190/4;
MPH=PID84/2;
VEr=RPM>300?MPH/RPM:VErp;
RSI=MPH>LSLim && abs(VEr/VErp-1)<0.03?1:0;
VEr=RSI?VEr:0.1*VEr+0.9*VErp;

Analyzing the Variables

Figure 12:
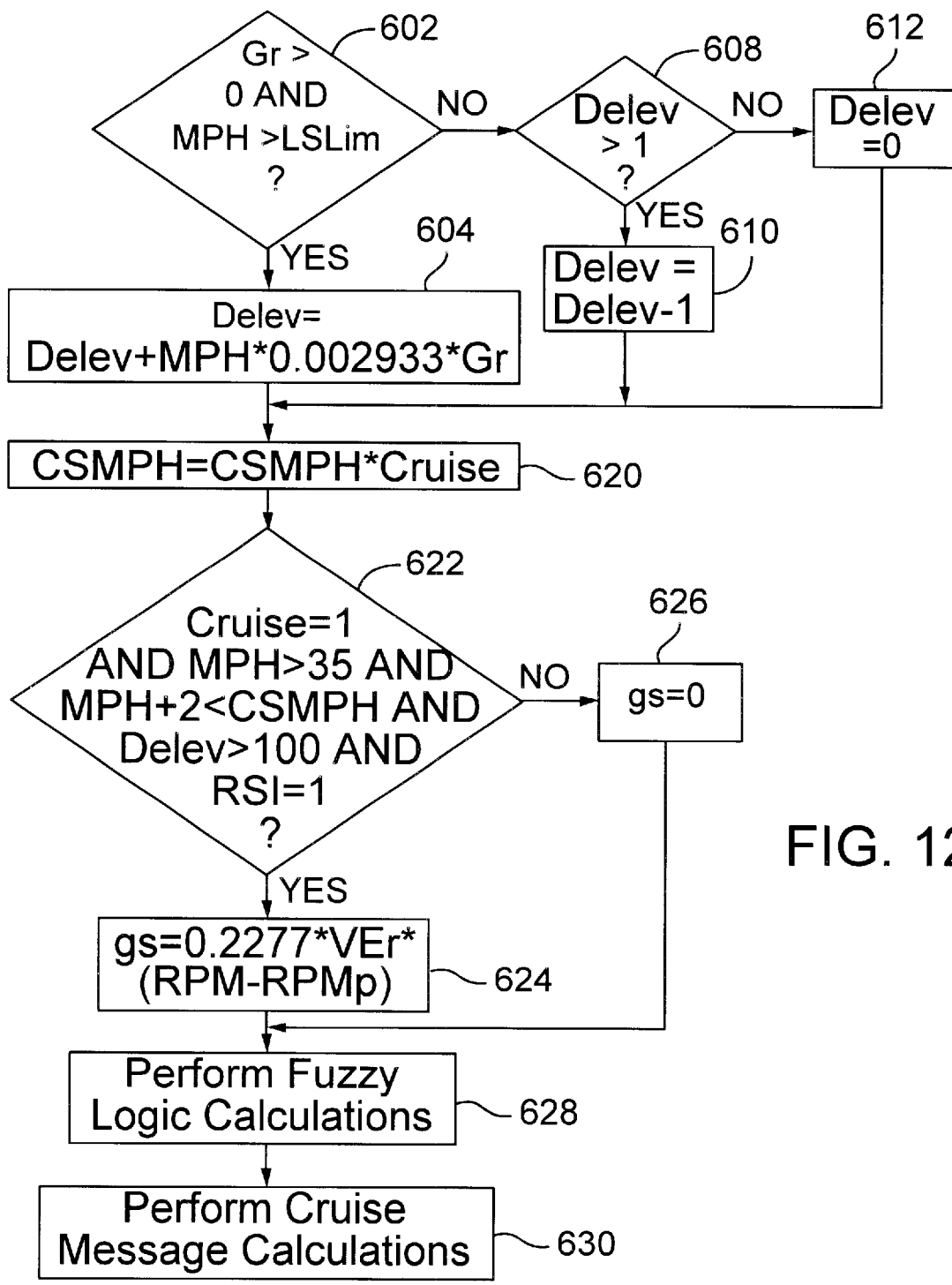
FIG. 12 is a flow diagram showing a method for analyzing variables in a terrain adaptive cruise control system.

Detailed steps for analyzing the variables using a fuzzy logic technique are shown in FIG. 12. The change in vehicle elevation is calculated as follows. If the vehicle grade indicates the vehicle is traveling uphill and the derived vehicle road speed is greater than the low speed limit (step 602), the change in vehicle's elevation is increased by the derived vehicle road speed multiplied by the grade multiplied by 0.002933 (step 604). Otherwise, if the change in elevation is greater than 1 (step 608), 1 is subtracted from it (step 610). If the change in elevation is not greater than 1, it is set to 0 (step 612). The value 0.002933 derives elevation (in feet) from miles per hour (1.467 feet/second) * percent grade (0.01) * elapsed time (0.2 seconds).

The cruise set speed is set to the cruise set speed multiplied by the cruise value (step 620). This step sets the cruise set speed to zero if the cruise control is not active.

The acceleration of the vehicle is then calculated as follows. If the cruise control is active; the derived vehicle road speed is over 35 miles per hour; the derived vehicle road speed is lagging at least 2 miles per hour behind the cruise set speed; the increase in elevation is at least 100 feet; and the transmission is not being shifted (step 622), the acceleration is calculated according to the following formula (step 624):

$$gs = 0.2277 * VEr * (RPM-RPMp).$$

Calculating gs using RPM-RPMp utilizes the increased speed resolution provided by PID 190, which was used to calculate RPM. Otherwise, the acceleration is set to 0 (step 626).

The preceding steps can be represented using Backus-Naur Form (BNF) notation as follows:

Delev=Gr>0&&MPH>LSLim?Delev+
   MPH*0.002933*Gr:Delev>1?Delev-1:0;

CSMPH=CSMPH*Cruise;

gs=Cruise&&MPH>35&&MPH+
   2<CSMPH&&Delev>100&& RSI?0.2277*VEr*
   (RPM-RPMp):0;

The system then performs fuzzy logic calculations (step 628) and cruise message calculations (step 630) as described in more detail below.

Fuzzy Logic Calculations

Figure 13:
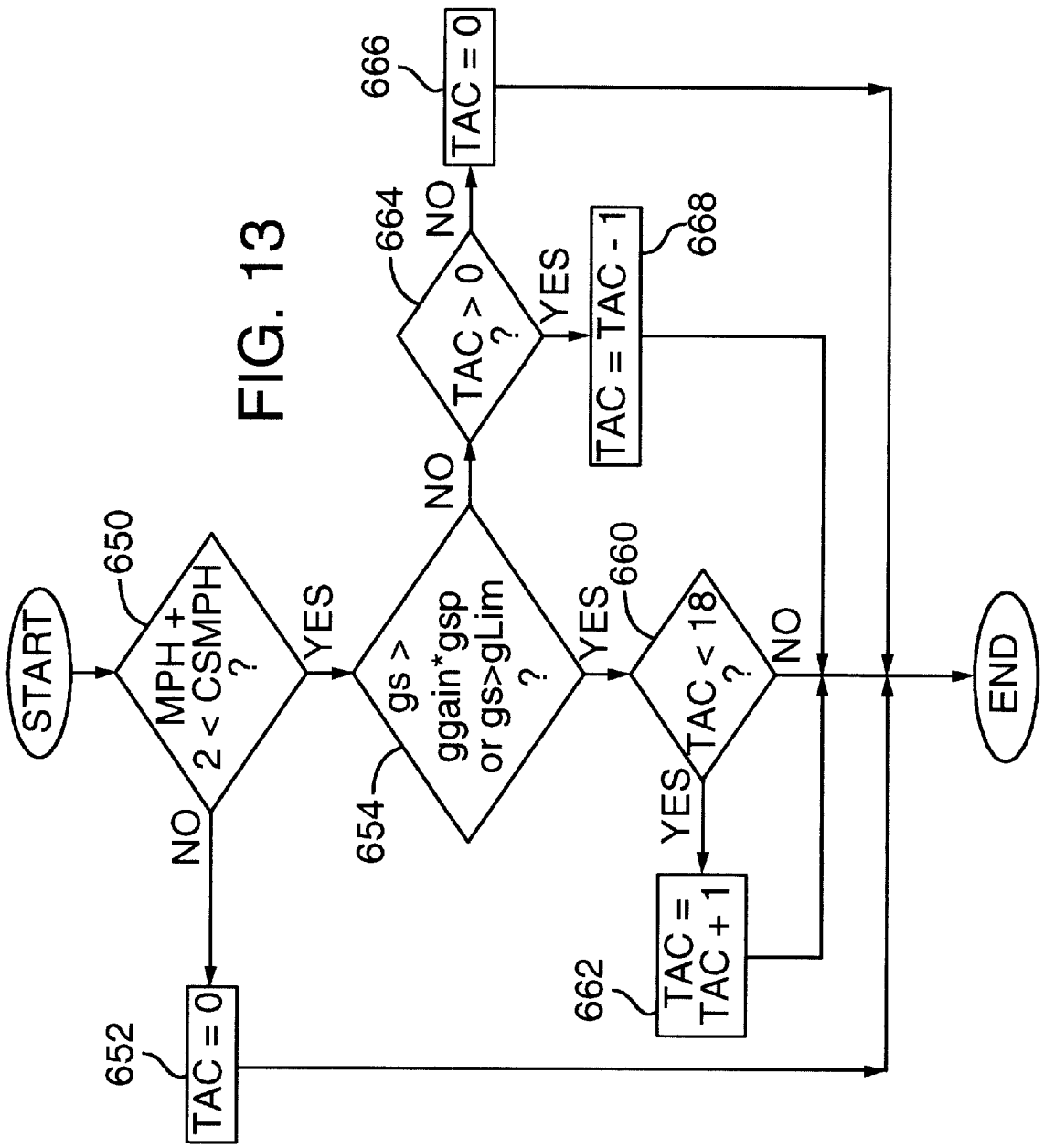
FIG. 13 is a flow diagram showing a method for a fuzzy logic system for predicting when a vehicle is cresting a hill.

FIG. 13 shows the steps performed to maintain TAC, a fuzzy logic variable. TAC generally indicates with what degree of confidence the system has determined that the vehicle is cresting a hill. Initially, TAC is set to zero. Once the vehicle begins climbing a substantial grade (as indicated when the vehicle road speed lags behind the cruise set speed), the system monitors the vehicle's acceleration and manipulates TAC, incrementing it or decrementing it depending on whether there has been an increase in acceleration. Thus, TAC generally indicates whether the vehicle's acceleration has substantially continuously increased after climbing a substantial grade. The vehicle's acceleration need not continuously increase in a strict sense; in other words, the system tolerates deviations from continuously increasing acceleration. In the illustrated implementation, it is determined the vehicle is cresting a hill when TAC exceeds a predetermined threshold (i.e., 9); the system can be tuned by changing the threshold.

If the derived vehicle road speed is not lagging behind the cruise set speed (step 650), TAC is set to 0 (step 652). Otherwise, an increase-in-acceleration rule is consulted to determine whether there has been sufficient acceleration gain (step 654). In the illustrated implementation, either a percentage gain over a certain amount or an absolute gain over a certain amount is considered to be a sufficient acceleration gain; however, a different rule might work as well or better in alternative embodiments. If there is sufficient acceleration gain and TAC is less than 18 (step 660), 1 is added to TAC (step 662).

If there is not sufficient acceleration gain, and TAC has a negative value (step 664), TAC is set to 0 (step 666). If TAC has a positive value, 1 is subtracted from TAC (step 668). Such an arrangement can be useful if, for example, the acceleration gain has momentarily fallen below a sufficient level, but further iterations determine the vehicle is cresting a hill. To tune the system, some value other than 1 could be subtracted from TAC.

The preceding steps can be represented using Backus-Naur Form (BNF) notation as follows:

TAC=MPH+2<CSMPH?gs>1.04*gsp
   gs>0.05?TAC<18?TAC+1:TAC:TAC>0?TAC-1:0:0;

Cruise Message Calculations

Figure 14:
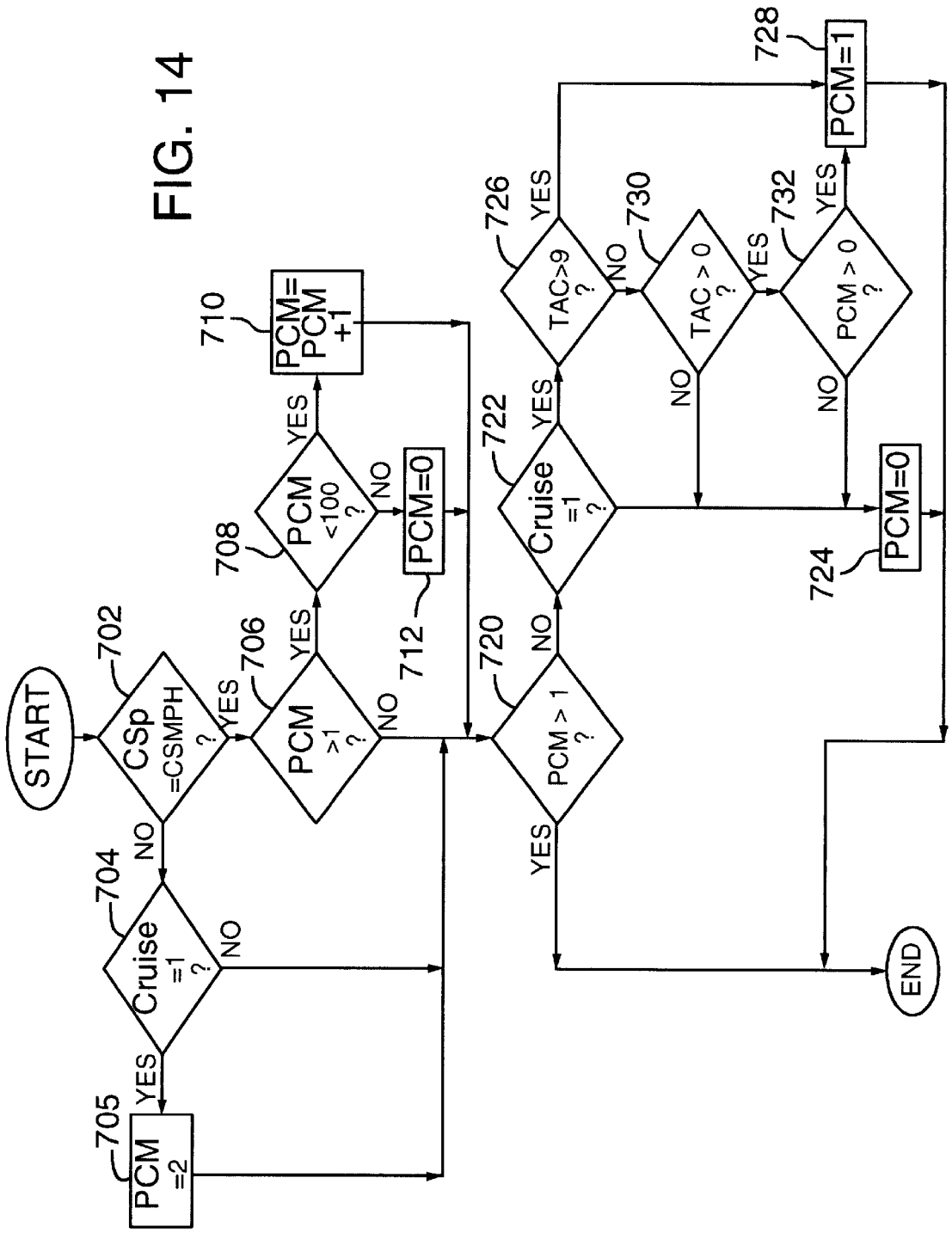
FIG. 14 is a flow diagram showing a method for cruise message calculations in a terrain adaptive cruise control system.

Detailed steps for performing cruise message calculations are shown in FIG. 14. The PCM variable is used to sustain a cruise message on the message center.

The previous cruise set speed is compared to the cruise set speed (step 702). If the two are not equal, the status of the cruise control is checked (step 704). If the cruise control is active, PCM is set to 2 (step 705), otherwise the method proceeds to step 720.

If the previous cruise set speed is equal to the cruise set speed, and PCM is not greater than 1 (step 706), the method proceeds to step 720. If PCM is greater than 1, and PCM is less than 100 (step 708), 1 is added to PCM (step 710). If PCM is not less than 100, PCM is set to zero (step 712). The method then proceeds to step 720.

At step 720, the value of PCM is checked. If the value is greater than 1, the method ends. Otherwise, the cruise status is checked (step 722). If the cruise is not active, PCM is set to zero (step 724). Otherwise, the value of TAC is checked (step 726). If TAC is greater than 9, PCM is set to 1 (step 728). Otherwise, if TAC has a negative value (step 730), PCM is set to zero (step 724).

If TAC has a positive value, the value of PCM is checked (step 732). If PCM has a positive value, PCM is set to 1 (step 728), otherwise, PCM is set to zero (step 724).

The preceding steps can be represented using Backus-Naur Form (BNF) notation as follows:

PCM=CSp==CSMPH?PCM>1?PCM<100?PCM+
   1:0:PCM:Cruise?2:PCM;

PCM=
   PCM?>1?PCM:Cruise?TAC>9?1:TAC?PCM?1:0:0:0;

Smoothing the Variables

Detailed steps for performing smoothing calculations are shown in FIG. 15. If the derived vehicle engine speed is not over 300 RPM (step 752), the "previous" derived vehicle road speed is set to zero (step 754). Otherwise, the "previous" derived vehicle engine speed is set to a weighted average of the current derived vehicle engine speed and the "previous" derived vehicle engine speed, with a weighting of 20% and 80%, respectively (step 756).

Then, the acceleration of the vehicle is checked (step 760). If it is negative, the "previous" acceleration of the vehicle is set to zero (step 762). If the acceleration is not negative, the "previous" acceleration of the vehicle is set to a weighted average of the current vehicle acceleration and the "previous" vehicle acceleration, with a weighting of 20% and 80%, respectively (step 764).

The preceding steps can be represented using Backus-Naur Form (BNF) notation as follows:

RPMp=RPM>300?0.2*RPM+0.8*RPMp:0;

gsp=gs>0?0.2*gs+0.8*gsp:0;

Terrain Adaptive Actions

Upon having determined the vehicle is cresting a hill, the terrain adaptive cruise control can take a variety of actions.

For purposes of example, three alternatives are illustrated: an open loop implementation, a partially-closed loop implementation, and a closed loop implementation.

Open Loop

Figure 16:
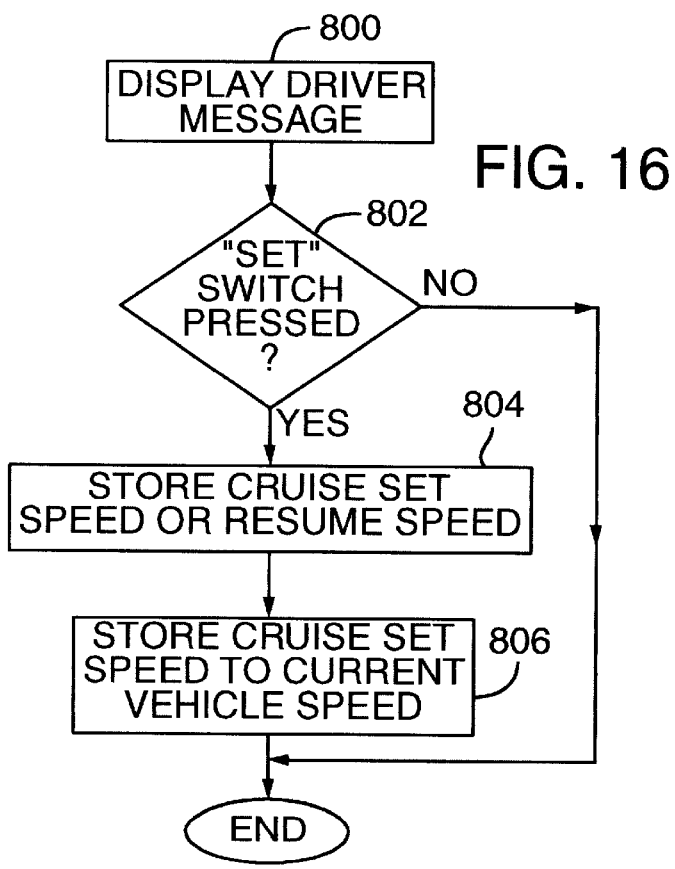
FIG. 16 shows actions taken after determining the vehicle is cresting a hill in an open loop implementation of a terrain adaptive cruise control system.

In the open loop implementation, the driver adjusts the cruise control in response to an alert (e.g., a message) provided by the terrain adaptive cruise control system. A simple flowchart for an open loop implementation is shown at FIG. 16. The implementation displays an appropriate driver message indicating the set switch should be pressed (e.g., "PRESS CRUISE 'SET'") (step 800). Alternatively, an audio alert (e.g., a buzzer or a synthesized voice) could be provided. The system subsequently monitors the "set" switch (step 802). When the "set" switch is pressed, the system stores the cruise set speed as the resume speed (step 804) and sets the cruise set speed to the current speed (step 806). Subsequently, when the driver presses the resume switch, the vehicle gradually accelerates to the resume speed and displays an appropriate message (e.g., "CRUISE SPEED SET AT xx.x MPH.") The rate at which the vehicle accelerates to the resume speed may be tuned by adjusting an input parameter.

Partially-Closed Loop

Figure 17:
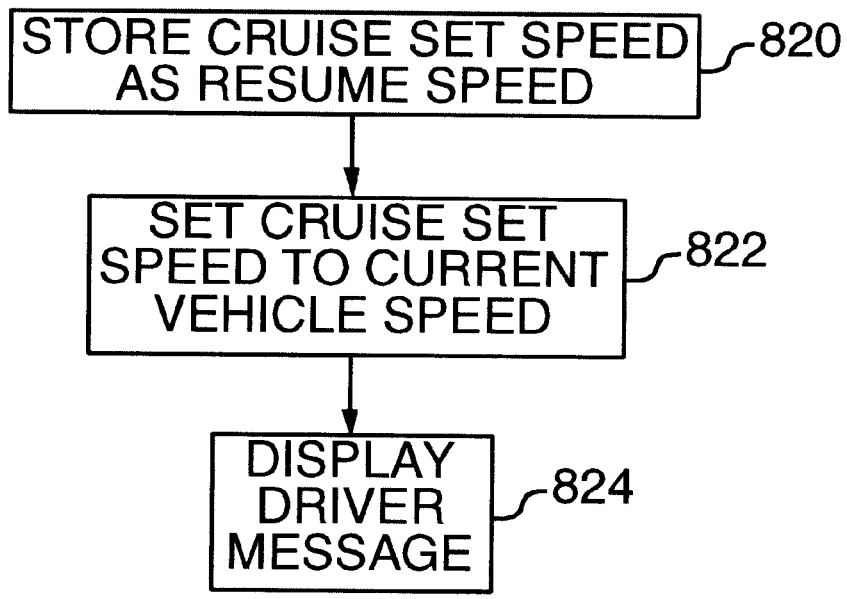
FIG. 17 shows actions taken after determining the vehicle is cresting a hill in a partially-closed loop implementation of a terrain adaptive cruise control system.

In the partially-closed loop implementation, the cruise set speed is automatically manipulated in response to the system's determination that the vehicle is cresting a hill; the driver can then press the resume switch to resume the previous cruise set speed. A simple flowchart for a partially-closed loop implementation is shown at FIG. 17. The implementation stores the cruise set speed as the resume speed (step 820). Then the system sets the cruise set speed to the current speed (step 822) and displays a driver message indicating the cruise speed has been changed (e.g., "CRUISE SPEED SET AT xx.xx MPH") (step 824). Subsequently, when the driver presses the resume switch, the vehicle is returned to the resume speed.

Closed Loop

Figure 18:
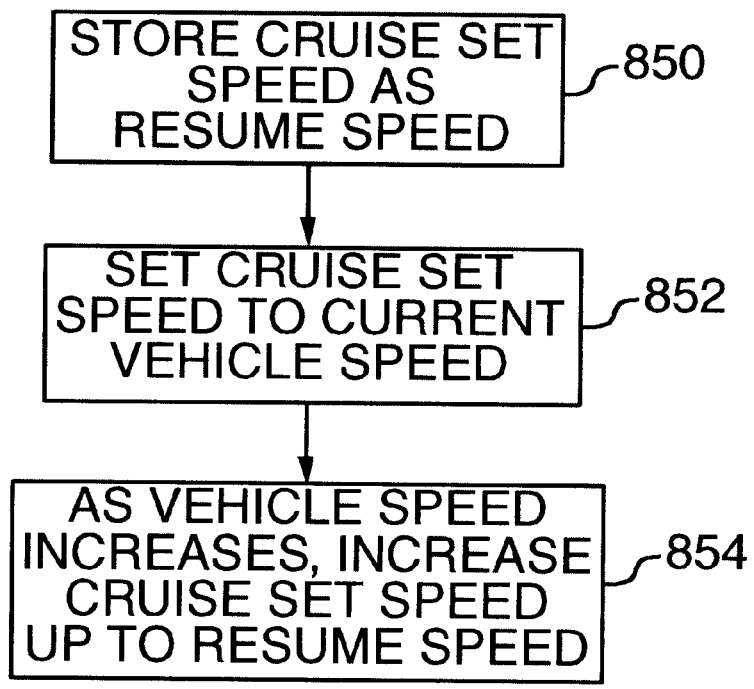
FIG. 18 shows actions taken after determining the vehicle is cresting a hill in a closed loop implementation of a terrain adaptive cruise control system.

In the closed loop implementation, both cruise set and resume functions are performed without driver intervention. A simple flowchart for a closed loop implementation is shown in FIG. 18. The implementation stores the cruise set speed as the resume speed (step 850). Then the cruise set speed is set to the current speed (step 852). As the vehicle speed increases, the cruise set speed is increased until it reaches the resume speed (step 854). Applying either the service or engine brakes caps the cruise set speed at the vehicle's current speed. Pressing the resume switch returns the vehicle to the resume speed.

Under any of the three options, when the resume switch is pressed or the cruise set speed is changed, a driver message indicating the cruise set speed may be displayed (e.g., "CRUISE SPEED SET AT xx.x MPH").

Driver Training Method and System

Additionally, the described method of providing feedback to the driver is a method for providing driver training. Since the system provides a message to the driver advising the driver to perform a driving action, the driver learns to recognize when to take similar driving actions in the future. In general, the driver training method proceeds by monitoring vehicle performance data during driver operation of the vehicle, evaluating the vehicle performance data to determine whether the driver has engaged in a particular behavior. Certain patterns of vehicle performance data indicate various behaviors. For example, if the system observes the vehicle is cresting a hill and the driver has failed to modify the cruise set speed, the driver's inaction is an inefficient driving behavior that can be detected by monitoring the vehicle performance data.

When the observed vehicle performance data falls within a pattern of vehicle performance data indicating a particular behavior, the system provides feedback to the driver to take a corrective driving action. By providing the driver with feedback indicating the cruise set speed should be changed, the system teaches the driver to make more efficient driving decisions when operating the vehicle in the future. Since the driver learns to recognize when to perform certain driving actions, the driver subsequently avoids the observed inefficient behavior, and vehicle operating and maintenance costs are reduced.

In addition, the driver training method can be applied to the fuel use efficiency system described in U.S. patent application Ser. No. 08/982,117 to Ehlbeck et al. entitled, "Fuel Use Efficiency System for Assisting the Driver to Improve Fuel Economy," previously incorporated by reference. The training system can be implemented in a variety of other applications such as accident avoidance applications (e.g., advising when the vehicle is following another too closely) and brake monitoring (e.g., to avoid hard braking or excessive downhill braking). Other applications include monitoring off-tracking, advising of slippery road conditions, determining when a vehicle's air suspension is improperly deflated, or warning when roll stability is outside specified bounds. Since the training system operates in the vehicle itself, it is sometimes called an "on-board driver training system."

By providing appropriate feedback, the on-board driver training system helps train the driver to avoid certain patterns of behavior known to unnecessarily expend resources or otherwise break specified driving rules. In this way, the system reduces costs associated with driving and maintaining the vehicle.

Alternatives

Various other arrangements of the system are possible. For instance, an implementation in a different architecture might group logic from the terrain adaptive cruise module with logic in another module. Further, the system might iterate through the main loop at some rate other than every 200 milliseconds. Also, rather than determining the derived vehicle road speed is lagging behind the cruise set speed when the derived vehicle road speed is slower than the cruise set speed minus 2, some value other than 2 could be used.

Having described and illustrated the principles of my invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A method of adapting operation of a vehicle to upcoming terrain grades, the method comprising:
    tracking vehicle performance data during operation of the vehicle;
    detecting from the vehicle performance data whether the vehicle has encountered conditions indicating the vehicle is cresting a hill; and
    performing an action to modify operation of the vehicle as a result of detecting the vehicle has encountered conditions indicating the vehicle is cresting a hill;
    wherein the vehicle has a cruise control system; and
    the action modifies operation of the cruise control system; and
    wherein the cruise control system maintains vehicle speed at a cruise set speed; and
    the action comprises providing an alert instructing a driver of the vehicle to adjust the cruise set speed.

2. The method of claim 1 wherein
    the cruise control system maintains vehicle speed at a cruise set speed; and
    the alert comprises displaying a message indicating the cruise set speed be reduced on a display visible to a driver of the vehicle.

3. A method of adapting operation of a vehicle to upcoming terrain grades, the method comprising:
    tracking vehicle performance data during operation of the vehicle;
    detecting from the vehicle performance data whether the vehicle has encountered conditions indicating the vehicle is cresting a hill; and
    performing an action to modify operation of the vehicle as a result of detecting the vehicle has encountered conditions indicating the vehicle is cresting a hill;
    wherein the vehicle has a cruise control system;
    the action modifies operation of the cruise control system;
    the cruise control system comprises a cruise set speed;
    the action comprises automatically reducing the cruise set speed without driver intervention; and
    the vehicle has a current speed and the action comprises automatically reducing the cruise set speed to the current speed of the vehicle without driver intervention.

4. The method of claim 3 further comprising:
    before reducing the cruise set speed, storing the cruise set speed; and
    after reducing the cruise set speed, and after receiving an indication to resume the stored cruise set speed, restoring the cruise set speed to the stored cruise set speed.

5. The method of claim 3 further comprising:
    before reducing the cruise set speed, storing the cruise set speed as an original speed; and
    increasing the cruise set speed to equal the current speed of the vehicle automatically without driver intervention until the current speed of the vehicle reaches the original speed.

6. The method of claim 5 further comprising:
    restoring the cruise set speed to the stored cruise set speed upon receiving a resume indication.

7. A method of adapting operation of a vehicle to upcoming terrain grades, the method comprising:
    tracking vehicle performance data during operation of the vehicle;
    detecting from the vehicle performance data whether the vehicle has encountered conditions indicating the vehicle is cresting a hill;
    performing an action to modify operation of the vehicle as a result of detecting the vehicle has encountered conditions indicating the vehicle is cresting a hill;
    calculating an acceleration variable from the vehicle performance data;
    calculating a vehicle road speed from the vehicle performance data; and
    storing a cruise set speed;
    wherein the detecting comprises monitoring an increase in the acceleration variable to determine whether the vehicle is cresting a hill;
    the vehicle has a cruise control system;
    the action modifies operation of the cruise control system; and
    the detecting step comprises monitoring an increase in the acceleration variable to determine if the acceleration has substantially continuously increased and if the vehicle road speed has lagged behind the cruise set speed.

8. The method of claim 7 further comprising
    storing an engine-speed variable reflecting engine speed of the vehicle;
    storing a previous-engine-speed variable reflecting past values of the engine-speed variable;
    calculating the acceleration variable by calculating a difference between the engine-speed variable and the previous-engine-speed variable.

9. The method of claim 7 further comprising
    storing a previous-acceleration variable; and
    smoothing the previous-acceleration variable with past values of the acceleration variable;
    wherein the detecting step comprises comparing the acceleration variable and the smoothed previous-acceleration variable to determine when vehicle acceleration has substantially continuously increased.

10. The method of claim 9 wherein the smoothing step comprises calculating a weighted average between the previous-acceleration variable and a past value of the acceleration variable.

11. A method of, adapting operation of a vehicle to upcoming terrain grades, the method comprising:
    tracking vehicle performance data during operation of the vehicle;
    detecting from the vehicle performance data whether the vehicle has encountered conditions indicating the vehicle is cresting a hill;
    performing an action to modify operation of the vehicle as a result of detecting the vehicle has encountered conditions indicating the vehicle is cresting a hill;
    calculating engine-speed, elevation, and acceleration variables from the vehicle performance data;
    wherein the vehicle has a cruise control system;
    the action modifies operation of the cruise control system; and
    the detecting step comprises consulting the engine-speed, elevation, and acceleration variables to determine whether the vehicle is cresting a hill.

12. A method of adapting operation of a vehicle to upcoming terrain grades, the method comprising:
    tracking vehicle performance data during operation of the vehicle;
    detecting from the vehicle performance data whether the vehicle has encountered conditions indicating the vehicle is cresting a hill;

performing an action to modify operation of the vehicle as a result of detecting the vehicle has encountered conditions indicating the vehicle is cresting a hill;
maintaining a variable indicative of substantially continuous increases in acceleration of the vehicle; and
incrementing the variable when a substantial increase in acceleration is detected;
wherein the vehicle has a cruise control system;
the action modifies operation of the cruise control system; and
the detecting step comprises comparing the variable to a threshold to determine whether the vehicle is cresting a hill.

13. The method of claim 12 wherein the variable is incremented when acceleration of the vehicle increases by more than a predetermined percentage or when acceleration of the vehicle increases by more than a predetermined amount.

14. The method of claim 12 further comprising:
maintaining a variable indicative of vehicle speed;
maintaining a variable indicative of cruise set speed; and
clearing the variable indicative of substantially continuous increases in acceleration of the vehicle when the variable indicative of vehicle speed is not lagging behind the variable indicative of cruise set speed.

15. A method of determining when a vehicle is cresting a hill, the method comprising:
maintaining a measured degree of confidence value indicative of measured certainty that the vehicle is cresting a hill;
specifying a target degree of confidence value defining sufficient measured certainty that the vehicle is cresting a hill when met by the measured degree of confidence value;
conducting plural successive observations of acceleration of the vehicle;
specifying an increase-in-acceleration rule to evaluate sets of the successive observations of acceleration of the vehicle;
for a plurality of the sets of the successive observations of acceleration of the vehicle, increasing the measured degree of confidence value when a set out of the sets of successive observations of acceleration of the vehicle satisfies the increase-in-acceleration rule; and
providing an indicator indicative of cresting a hill when the measured degree of confidence value meets the target degree of confidence value.

16. The method of claim 15 further comprising:
for at least one of the sets of the successive observations of acceleration of the vehicle, decreasing the measured degree of confidence value when the set of the successive observations of acceleration of the vehicle does not satisfy the increase-in-acceleration rule.

17. The method of claim 15 further comprising:
responsive to the indicator, setting a cruise set speed of the vehicle to a current speed of the vehicle.

18. A method of determining when a vehicle is cresting a hill, the method comprising:
specifying a specimen acceleration signature indicative of when the vehicle is cresting a hill;
periodically monitoring the acceleration of the vehicle to generate an observed acceleration signature representing plural vehicle acceleration observations;
specifying a degree of confidence setting specifying how far the specimen signature may deviate from the observed acceleration signature;
providing an indicator indicative of cresting a hill when the observed acceleration signature matches the specimen acceleration signature within the degree of confidence setting.

19. The method of claim 18 further comprising:
responsive to the indicator, setting a cruise set speed of the vehicle to a current speed of the vehicle without driver intervention.

20. A method for adapting operation of a vehicle to terrain variation while operating the vehicle on a roadway, the method comprising:
maintaining a cruise set speed for the vehicle;
deriving a vehicle road speed, a vehicle engine speed, a ratio of the vehicle road speed to the vehicle engine speed, a change in vehicle elevation, a grade of the roadway, and a vehicle acceleration from sensors on the vehicle;
determining whether the vehicle's transmission is being shifted;
determining whether a degree of confidence variable should be manipulated by analyzing whether the grade of the roadway is an upward grade, whether the vehicle road speed is lagging behind the cruise set speed, whether the transmission is being shifted, and whether the change in vehicle elevation is greater than a predetermined amount;
when it is determined the degree of confidence variable should be manipulated, analyzing whether the vehicle acceleration has increased over a predetermined amount to determine whether to increment or decrement the degree of confidence variable; and
displaying a message advising manipulation of the cruise control system on a driver-viewable display when the degree of confidence variable exceeds a predetermined threshold.

21. In a vehicle, a terrain prediction system comprising:
a parameter store for storing parameters comprising a speed parameter measured by a sensor for measuring vehicle speed; and
a parameter analyzer module operative to analyze the parameters in the parameter store to determine when the vehicle is cresting a hill, and further operative to provide an alert when the parameter analyzer determines the vehicle is cresting a hill;
wherein the alert instructs a driver of the vehicle to adjust the cruise set speed.

22. A cruise control system of a vehicle having an engine, the system comprising:
a parameter store for storing parameters comprising a speed parameter measured by a sensor for measuring vehicle speed and a cruise set speed;
a speed control system for maintaining power to the engine until the speed parameter in the parameter store indicates the vehicle has reached the cruise set speed in the parameter store;
a parameter analyzer module operative to analyze the parameters in the parameter store to determine when the vehicle is cresting a hill, and further operative to perform an action to reduce the cruise set speed when it is determined the vehicle is cresting a hill; and
a driver message center operative to receive a message from the parameter analyzer module;
wherein the action performed by the parameter analyzer comprises sending a message to the driver message center for output.

23. The cruise control system of claim 22 further comprising:
an actuator operable by a driver to reduce the cruise set speed to a current speed of the vehicle.

24. A cruise control system of a vehicle having an engine, the cruise control system comprising:
means for measuring vehicle performance data, wherein the data comprise a road speed of the vehicle;
means for storing a cruise set speed;
means for applying additional power to the engine when the road speed falls below the cruise set speed; and
means for analyzing vehicle performance data to determine whether the vehicle is cresting a hill and modify the cruise set speed when it is determined the vehicle is cresting a hill.

25. The cruise control system of claim 24 wherein:
the cruise set speed is automatically modifiable.

26. The cruise control system of claim 24 wherein:
the cruise set speed is semi-automatically modifiable.

27. A computer-readable medium having computer-executable instructions for performing the following acts to adapt operation of a vehicle to upcoming terrain grades:
tracking vehicle performance data during operation of the vehicle;
detecting from the vehicle performance data whether the vehicle has encountered conditions indicating the vehicle is cresting a hill; and
performing an action to modify operation of the vehicle as a result of detecting the vehicle has encountered conditions indicating the vehicle is cresting a hill;
wherein the vehicle has a cruise control system; and
the action modifies operation of the cruise control system; and
wherein the cruise control system maintains vehicle speed at a cruise set speed; and
the action comprises providing an alert instructing a driver of the vehicle to adjust the cruise set speed.

28. A vehicle comprising:
an electronic control unit for storing variables comprising a variable indicative of vehicle road speed, a variable indicative of vehicle engine speed, a variable indicative of vehicle acceleration, and a variable indicative of cruise set speed;
a software module for analyzing the variables stored by the electronic control unit to determine the vehicle is cresting a hill; and
a cruise control comprising a cruise set speed and responsive to the software module to modify the cruise set speed when the software module determines the vehicle is cresting a hill.

* * * * *